United States Patent
Mahalingaiah

(10) Patent No.: US 9,652,899 B2
(45) Date of Patent: May 16, 2017

(54) METHODS, APPARATUS AND SYSTEMS FOR ACCESSING VEHICLE OPERATIONAL DATA USING AN INTELLIGENT NETWORK ROUTER

(75) Inventor: Pradeep Mahalingaiah, Karnataka (IN)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 1229 days.

(21) Appl. No.: 12/421,505

(22) Filed: Apr. 9, 2009

(65) Prior Publication Data

US 2010/0263024 A1 Oct. 14, 2010

(51) Int. Cl.
| | | |
|---|---|---|
| *G07C 5/08* | (2006.01) | |
| *H04L 29/06* | (2006.01) | |
| *G06F 21/62* | (2013.01) | |
| *G07C 5/00* | (2006.01) | |
| *H04L 29/12* | (2006.01) | |
| *H04B 7/185* | (2006.01) | |

(52) U.S. Cl.
CPC ......... *G07C 5/008* (2013.01); *H04B 7/18506* (2013.01); *H04L 61/2007* (2013.01); *H04L 61/2503* (2013.01); *H04L 61/256* (2013.01); *H04L 61/2528* (2013.01); *H04L 61/2592* (2013.01); *H04L 63/0236* (2013.01); *H04L 63/0281* (2013.01); *H04L 63/0428* (2013.01); *G07C 5/0808* (2013.01)

(58) Field of Classification Search
CPC .. G07C 5/008; G07C 5/0808; H04B 7/18506; H04L 61/2503; H04L 61/2528; H04L 61/2592; H04L 63/0281; H04L 63/0428

USPC .......................................................... 726/4
See application file for complete search history.

(56) References Cited

U.S. PATENT DOCUMENTS

| | | | | |
|---|---|---|---|---|
| 6,289,382 B1 * | 9/2001 | Bowman-Amuah | ......... | 709/226 |
| 6,332,163 B1 * | 12/2001 | Bowman-Amuah | ......... | 709/231 |
| 6,732,027 B2 | 5/2004 | Betters et al. | | |
| 6,816,762 B2 * | 11/2004 | Hensey et al. | ............... | 701/32.6 |
| 7,088,461 B2 * | 8/2006 | Miyano | ........................ | 358/1.14 |
| 7,202,708 B2 * | 4/2007 | Luh et al. | ........................ | 327/77 |
| 7,302,497 B2 * | 11/2007 | Vilander et al. | ............... | 709/249 |
| 7,437,225 B1 | 10/2008 | Rathinam | | |
| 7,509,408 B2 * | 3/2009 | Kurita | ............................ | 709/223 |
| 7,599,691 B1 * | 10/2009 | Mitchell | ........................ | 455/431 |
| 7,852,861 B2 * | 12/2010 | Wu et al. | ........................ | 370/401 |
| 7,895,446 B2 * | 2/2011 | Harada et al. | ................. | 713/185 |
| 2002/0125998 A1 * | 9/2002 | Petite et al. | .............. | 340/286.01 |
| 2002/0160773 A1 * | 10/2002 | Gresham et al. | ............. | 455/431 |
| 2003/0055975 A1 * | 3/2003 | Nelson | ............... | H04B 7/18506 709/227 |
| 2004/0078123 A1 * | 4/2004 | Igloi et al. | ........................ | 701/29 |
| 2004/0193732 A1 * | 9/2004 | Nelson | ............... | H04B 7/18506 709/246 |
| 2004/0202199 A1 * | 10/2004 | Fischer et al. | ................. | 370/474 |
| 2005/0027997 A1 * | 2/2005 | Ueno et al. | .................... | 713/193 |

(Continued)

OTHER PUBLICATIONS

Espacenet search, Espacenet Result List, Jul. 2011.*

(Continued)

*Primary Examiner* — Theodore C Parsons
(74) *Attorney, Agent, or Firm* — Lorenz & Kopf, LLP

(57) ABSTRACT

Systems and methods are provided that allow more efficient access to vehicle health maintenance information within a vehicle. In addition, it is desirable to provide remote access to the health information by a plurality of users.

9 Claims, 3 Drawing Sheets

(56) References Cited

U.S. PATENT DOCUMENTS

| | | | |
|---|---|---|---|
| 2005/0267653 A1* | 12/2005 | Matsushita et al. | 701/14 |
| 2005/0286452 A1* | 12/2005 | Hardgrave | H04W 84/005 370/310 |
| 2007/0112489 A1* | 5/2007 | Avery et al. | 701/35 |
| 2007/0115938 A1* | 5/2007 | Conzachi et al. | 370/352 |
| 2008/0075090 A1 | 3/2008 | Farricker et al. | |
| 2008/0086637 A1 | 4/2008 | Royalty | |
| 2009/0012674 A1 | 1/2009 | McGuffin et al. | |
| 2009/0252150 A1* | 10/2009 | Puthupparambil et al. | 370/352 |

OTHER PUBLICATIONS

Stallings et al, Cryptography and Network Security, 3rd edition, Apr. 20, 2005.*
Rfc 2401, Kent, security architecture for the internet protocol, Nov. 1998.*
Rfc 2402, Kent, IP Authentication Header, Nov. 1998.*
Rfc, 2406, Kent, IP Encapsulating Security Payload, Nov. 1998.*
Rfc 2408, Maughan, Internet security association and key management protocol, Nov. 1998.*

* cited by examiner

METHODS, APPARATUS AND SYSTEMS FOR ACCESSING VEHICLE OPERATIONAL DATA USING AN INTELLIGENT NETWORK ROUTER

FIELD OF THE INVENTION

The present invention generally relates to the remote retrieval of information from a host computer, and more particularly relates to the remote access and retrieval of aircraft maintenance data from an aircraft by a plurality of maintenance information users.

BACKGROUND OF THE INVENTION

Modern aircraft are often configured with various systems that monitor and record data during flight operations for later analysis by maintenance personnel. The data typically resides in a central maintenance computer ("CMC") somewhere aboard the aircraft. The CMC may be further equipped with a local terminal whereby a maintenance person interrogates the CMC to determine the "health" of the aircraft by determining what components may be in need of replacement or repair. This type of aircraft health monitoring activity occurs on a regular basis and/or when needed.

Traditionally health monitoring of an aircraft required maintenance personnel to remain at, and work from, the CMC terminal. Maintenance personal were therefore required to travel to and remain onboard the aircraft to perform the requisite testing, all of which consumed valuable maintenance hours. Further, only a single mechanic at a time could access the information stored in the CMC.

Accordingly, it is desirable to provide a method and system allowing more efficient access to vehicle health information resident within a vehicle. In addition, it is desirable to provide remote access to the health information by a plurality of users. Furthermore, other desirable features and characteristics of the present invention will become apparent from the subsequent detailed description of the invention and the appended claims, taken in conjunction with the accompanying drawings and this background of the invention.

SUMMARY

A system is provided for securely accessing data from a vehicle. The system includes an internet protocol (IP) network, a remote communication device in communication with the IP network where the remote communication device is configured to transmit and receive data. The system also includes a source of the data within the vehicle and in communication with the IP network and a first intermediary computing device within the IP network. The intermediary computing device is configured to prevent communication between the remote communication device and the source of the data but allows communication between the remote communication device and the source of the data when the first intermediary computing device determines that a first source internet protocol (SrcIP) address of the remote communication device is an authorized first SrcIP address.

A method is provided for securely accessing a source of data. The method includes receiving a connection request message from a computing device within a network which includes a first source IP (SrcIP) address and an embedded second SrcIP address. It is then determined if the first SrcIP address is an authorized SrcIP address. If the first SrcIP address is an authorized SrcIP address then a communication session is granted to the computing device with the first SrcIP address allowing the computing device access to the source of the data. Otherwise the connection request message is rejected.

DETAILED DESCRIPTION OF THE INVENTION

The following detailed description of the invention is merely exemplary in nature and is not intended to limit the invention or the application and uses of the invention. Furthermore, there is no intention to be bound by any theory presented in the preceding background of the invention or the following detailed description of the invention.

The subject matter now will be described more fully below with reference to the attached drawings which are illustrative of various embodiments disclosed herein. Like numbers refer to like objects throughout the following disclosure. The attached drawings have been simplified to clarify the understanding of the systems, devices and methods disclosed. The subject matter may be embodied in a variety of forms. The exemplary configurations and descriptions, infra, are provided to more fully convey the subject matter disclosed herein.

The subject matter herein will be disclosed below in the context of an aircraft. However, it will be understood by those of ordinary skill in the art that the subject matter is similarly applicable to many vehicle types and information types. Non-limiting examples of other vehicle types in which the subject matter herein below may be applied includes aircraft, spacecraft, watercraft and terrestrial motor vehicles. Without limitation, terrestrial motor vehicles may also include military combat and support vehicles of any description. The subject matter disclosed herein may also be incorporated into any suitable communication and/or computing system that currently exists or that may be developed in the future and may utilize any suitable router, network or other type of communication node known in the art.

Figure 1:
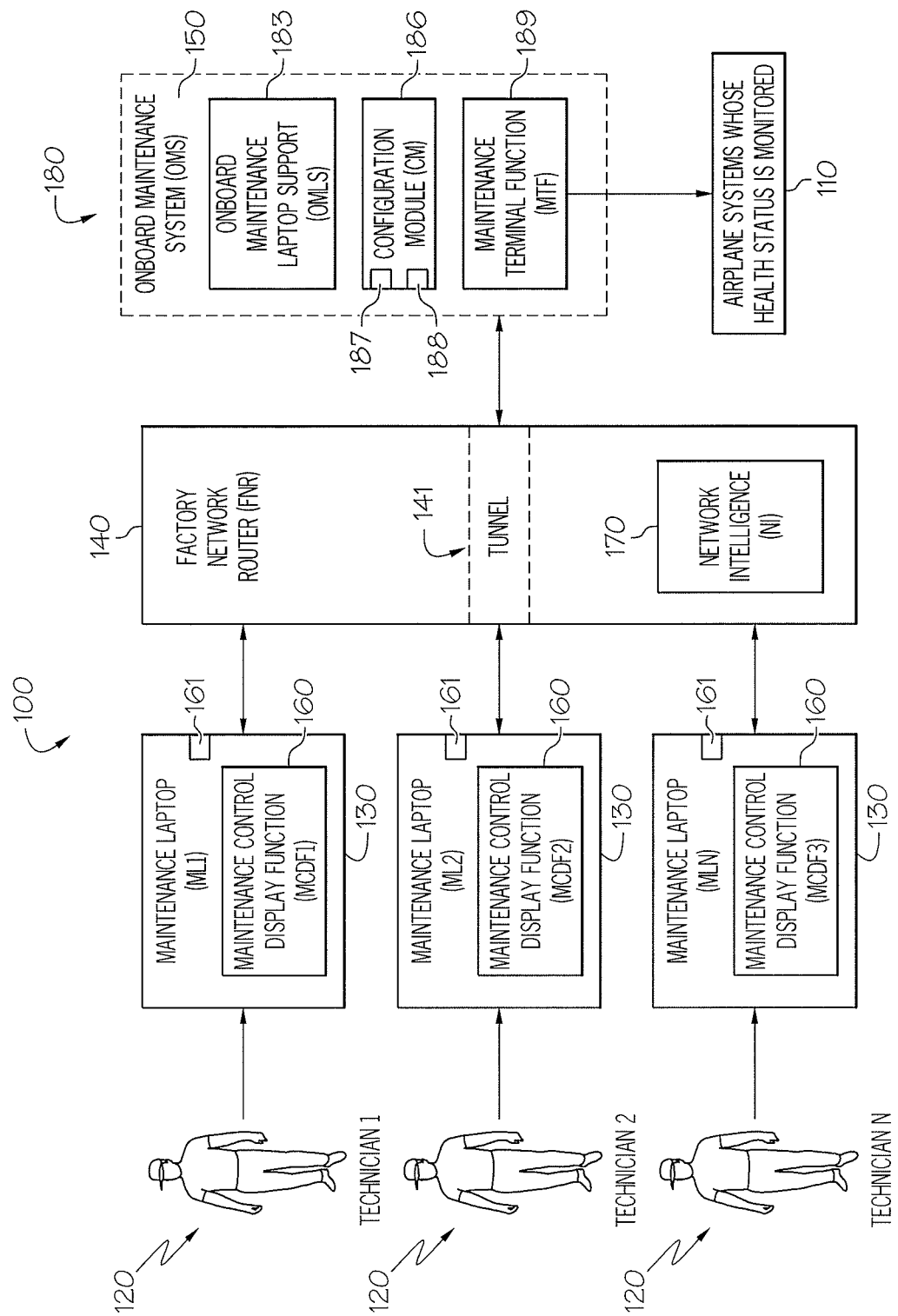
FIG. 1 is a block diagram illustrating an exemplary network disclosed herein.

FIG. 1 depicts of an exemplary embodiment of the subject matter disclosed herein. An exemplary communication network 100 is presented allowing remote access to a plurality of aircraft systems 110 by a plurality of technicians (1, 2 . . . N) 120. The network 100 comprises at least one communication device 130 associated with the plurality of technicians 120, a communications node or a router 140, and at least one onboard gateway/protocol server 150. The gateway/protocol server 150 is in operable communication with one or more of the aircraft systems 110. The network 100 may be a wireline network, a wireless network or a combination thereof and may utilize any suitable wireless protocol as may be found useful. A non-limiting exemplary wireless protocol may be one of the IEEE 802.11 family of wireless protocols of which non-limiting examples may include Wi-fi, Wi-max, Bluetooth and Zigbee.

Preferably, each technician 120 of the plurality is assigned, or otherwise associated with, a communication device 130 that has been programmed with its own unique identifier such as a source IP ("SrcIP") address. In other embodiments a single, or a small number of communication devices, may be used by the plurality of technicians. Each technician 120 may be identified by their own unique security pass code such as a traditional sign-on and password.

The communication device 130 may be any suitable communication device that may be configured to digitally communicate over network 100. Non-limiting examples of a communication device 130 may be a computer, a lap top computer, a hand held computer, a cell phone, a personal digital assistant, a pager and the like that currently exist or that may be developed in the future. For the sake of brevity and clarity, the communications device 130 will be referred to hereinafter as a maintenance laptop ("ML") 130.

The ML 130 may execute a number of software applications that may, for example, include an operating system (not shown), graphical user interface ("GUI") 200, and/or a web browser (not shown). The ML 130 may also execute various maintenance related applications. A non-limiting example of a maintenance related application is a Maintenance Control Display Function ("MCDF") 160.

The MCDF 160, is a user interface application that allows the technician to communicate remotely with the onboard gateway/protocol server 150 via the GUI 200 that is rendered on his ML 130. The onboard gateway/protocol server may be the onboard maintenance system ("OMS") 150 and will be referred to as such hereinafter.

Figure 2:
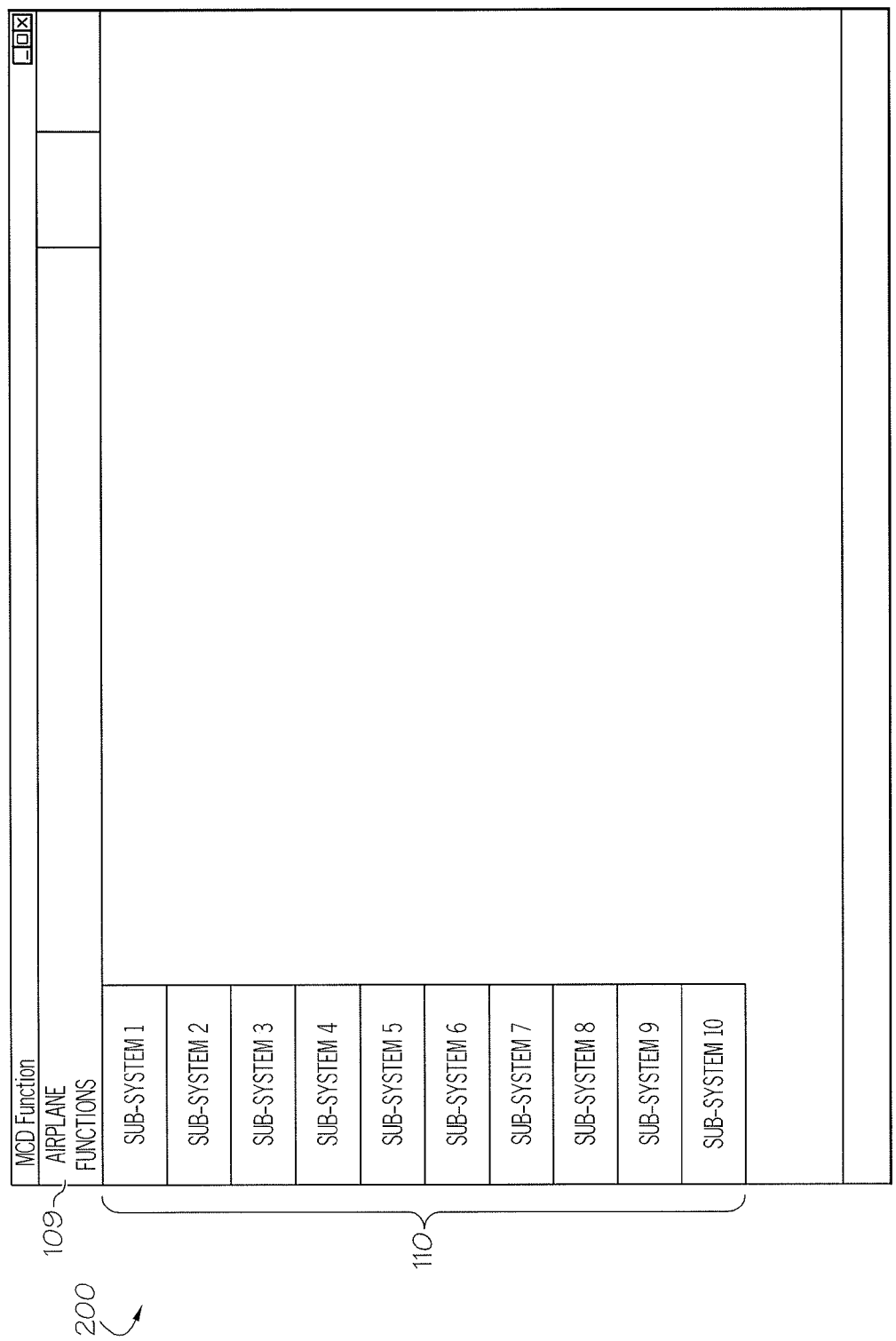
FIG. 2 is an illustration of exemplary Graphical User Interface.

FIG. 2 illustrates a non-limiting example of such a GUI 200. Among other control features that will be appreciated as being well known in the art, the GUI 200 may include a drop down menu feature 109 that provides the technician 120 with a selection of an aircraft's systems 110 with which the MCDF 160 may communicate.

The MCDF 160 may also be operable to launch a web browser that is commonly used to establish network communications. A non-limiting example of such a web browser is Internet Explorer® which is distributed by Microsoft Corporation of Redmond, Wash. However, it will be appreciated that communications across the network 100 may be established using other published and/or proprietary software.

The ML 130 may be further configured to send and receive packetized communications across the network 100, to and from a destination IP address. The destination address may refer to an onboard computer such as the onboard computer 180. The onboard computer 180 may be any suitably configured computing device such as the vehicle's central maintenance computer ("CMC") or other computing device working in conjunction with the vehicle's central maintenance computer such as OMS 150. For the sake of brevity and clarity, the onboard computer 180 will be henceforth referred to as the vehicle's CMC 180.

The CMC 180 may comprise a number of interrelated modules with different functions. These modules may comprise hardware, software, firmware or a combination thereof. One module is the OMS 150 which acts as a gateway/protocol server to other maintenance modules. Other maintenance modules may include an Onboard Maintenance Laptop Support ("OMLS") module 183, a Configuration Module ("CM") 186, and a Maintenance Terminal Function ("MTF") 189. The OMLS 183, the CM 186 and the MTF 189 may operate independently, may operate in cooperation with each other, or may operate as sub-modules to the OMS 150. The functions of the OMLS 183, the CM 186 and the MTF 189 will be discussed more fully below.

As described above, the network 100 may also include a communication node 140. Non-limiting examples of a communication node 140 may be any type of computing device capable of sending, receiving and processing packetized digital data as is well known in the art. The communications node 140 may be a general purpose computer, a special purpose computer, a router, a digital switch and the like that is configured to process and transmit packetized data. The communication node 140 may also be an intermediary communications network such as the internet or a telephonic communication system (e.g. a packet switched telephone network ("PSTN")).

Among other functions, the communication node 140 may perform IP address translation which may serve to mask a session connection between network participants, thereby providing a layer of communications security. The communications node 140 may also act as a firewall which guards access to the CMC 180. For the sake of clarity and brevity, the communications node 140 will be referred to hereinafter as a router 140.

In an exemplary embodiment, the router 140 may include a Network Intelligence Module ("NIM") 170. The NIM 170 may be comprised of software, hardware, firmware or a combination thereof. The NIM 170 is a security and traffic control module that maps (i.e. translates) communication requests from the various ML's 130, to various replies to those requests transmitted from a host computer, such as the CMC 180. The translation may include the use of SrcIP addresses that may be foreign to the initiating ML 130.

Specifically, the router 140 acts as a firewall between the various ML's 130 and the CMC 180. The NIM 170 then acts to create a tunnel 141 through the router 140. As may be appreciated, the IP tunnel 141 is a means for connecting two distinct IP networks that do not have a native routing path over which to communicate with each other. The tunnel 141 may also be used to create a virtual private network ("VPN") across a public network such as the internet. It will be appreciated that an IP tunnel 141 operates by establishing a gateway (i.e. a computing device or software module) at either end of the IP tunnel 141. The first gateway encapsulates a message created in one network within another message format that is native to the intermediary network and then reverses the process at the other end of the tunnel 141 to retrieve the original message by the second gateway. As will be more fully described below, the NIM 170 creates an IP tunnel 141 allowing limited user access to the CMC 180 through the router 140 and/or network(s) 303. (See FIG. 3)

A SrcIP address is a logical address that is assigned to devices participating in a computer network for communication with and between the various network nodes. Although a binary number, an exemplary human readable IP address may take the form of 123.45.188.166, using the internationally recognized version 4, 32-bit format or take the form of 2001:db8:0:1234:0:567:1:1 using the version 6, 128 bit format.

IP source addresses may be static addresses that are assigned to a particular network node or may be dynamic addresses that change each time that the computing device acting as a network participant is powered up. The IP source addresses contemplated herein may be either static or dynamic. However, in the interest of clarity and brevity, only the use of static SrcIP addresses will be discussed herein. The use of dynamic SrcIP addresses requires additional housekeeping functions to merely keep track and update the addresses of various components of the network 100 and, while well known in the art, extend beyond the scope of this disclosure. To further improve clarity, SrcIP addresses will be represented in the form $(ABCD)_i$ instead of the 32 or 128 bit formats discussed above.

As touched on above, the OMS 150 comprises a number of modules. The OMLS module 183 may act as a gateway server or a protocol server for the OMS 150. The OMLS 183 may be comprised of software, hardware, firmware or a combination thereof. As will be more fully described below, the OMLS 183 receives a connection request message from an MCDF 160 and determines whether the SrcIP address in the connection request message is one of a number of authorized SrcIP addresses that are stored in the CM 186. The CM 186 stores a defined list of SrcIP addresses that are pre-authorized to communicate with the MTF module 189 and maintains a registry of those addresses. For example, if the SrcIP address is not recognized by the CM 186, then a denial message is retuned to the requesting MCDF 160. If the SrcIP address is recognized, then communications between the MTF module 189 and the ML 130 is allowed.

The MTF module 189 is a computer interface that receives a request for data from an ML 130 and retrieves the requested data from one or more aircraft system 110 executing within the CMC 180, or retrieves the data from a standalone application executing within an aircraft system 110. The MTF 189 may also cause an application to provide information directly. The requested data may also be retrieved from a storage location (not shown) within the CMC 180. Upon receiving the data request, the MTF 189 then formats the information and transmits a reply message back to the SrcIP address that includes the requested information. The MTF 189 may be comprised of software, hardware, firmware or a combination thereof.

Figure 3:
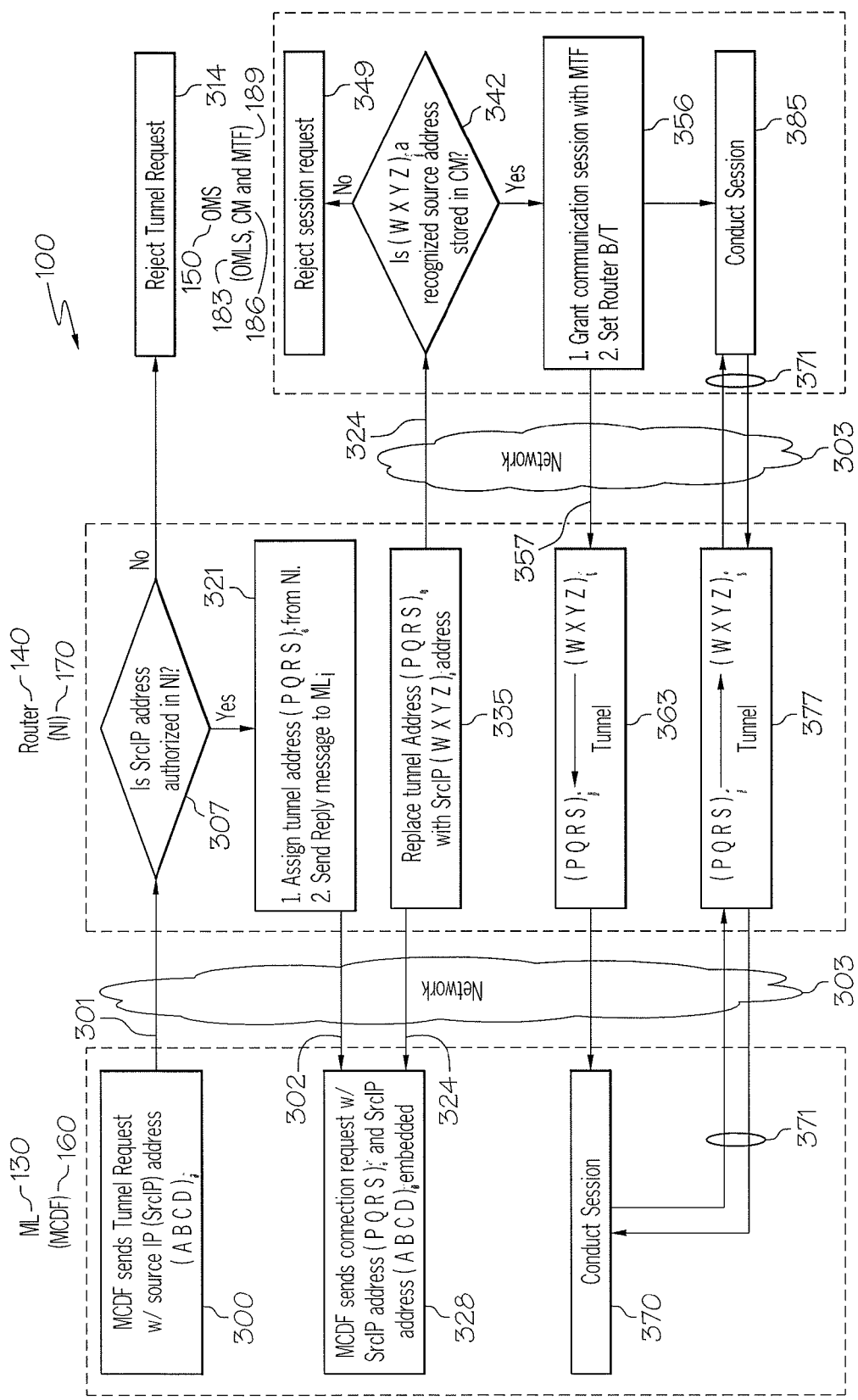
FIG. 3 is a flow diagram illustrating an exemplary embodiment of the method disclosed herein.

FIG. 3 is a flow diagram of an exemplary embodiment that may be used to establish remote, authorized communications between a technician 120 utilizing an ML 130 and the CMC 180 of an aircraft. It will be appreciated that as an exemplary embodiment, the method of FIG. 3 may be altered and still remain within the scope of the disclosure herein. Processes may be broken out into sub-processes, processes may be combined into higher level processes and processes may be replaced with other processes that may accomplish the same or a similar function.

At process 300, the technician 120 may launch a web browser 161 from his ML 130 which sends a request message 301 to the CMC 180 onboard a particular aircraft that may be parked on the tarmac at a particular location. The tunnel request message 301 may have any number of digital formats as may be known in the art that are suitable for traversing the network(s) 100. The request message may have at least a SrcIP address of the requesting ML $(ABCD)_i$ and a message header indicating that the message is a request message 301 and also indicating the network destination address of the CMC 180 onboard the aircraft.

The aircraft may be at the same location as the technician 120 or it may be at location very remote from the technician 120. Further, the technician may be a third party contractor and may not be under the direct employ of either the operating airline or the manufacturer of the aircraft. As such, any communications between the ML 130 and the CMC 180 may occur over several different intermediary networks 303 that may range from private local area networks ("LAN"), to the internet, or a telephone network such as a PSTN.

At decision point 307, the request message 301 passes through the router 140 which may or may not be associated with the location of the aircraft. It will be appreciated that the router 140 may be physically located anywhere but still be associated with and in operable communication with the aircraft. When received, the router 140 recognizes the intended destination IP address of the tunnel request message 301 and intercepts it. In other embodiments, the tunnel request message 301 may be addressed to the router 140 with a forwarding IP address of the intended destination which is the CMC 180 of the aircraft.

Within the router 140, the NIM 170 scrutinizes the tunnel request message header to determine if the SrcIP address $(ABCD)_i$ in the header is a SrcIP address of an authorized ML 130. If the SrcIP address is not recognized or is not authorized, the tunnel request message 301 is rejected at process 314. The NIM 170 may determine that the SrcIP address $(ABCD)_i$ is not an authorized address by comparing the SrcIP address $(ABCD)_i$ to a set of pre-authorized source addresses that are stored in the NIM 170, or in a memory device (not shown) in operable communication with the NIM 170.

If the SrcIP address $(ABCD)_i$ is recognized and authorized, then the NIM 170 assigns a tunnel 141 address $(PQRS)_i$ from a list of pre-established tunnel addresses $(PQRS)_{i-n}$ that will be automatically recognized and forwarded by the router 140. A tunnel reply message 302 is then returned to the requesting $ML_i$ 130 by the router 140 that includes the assigned tunnel 141 address $(PQRS)_i$.

At process 328, the requesting $ML_i$ 130 sends a connection request message 324 to the CMC 180 of the aircraft of interest. The message is a nested message as is known in the art that allows unhindered tunneling across an intermediary network such as the router 140. As such, the connection request message 324 will exhibit the tunnel 141 SrcIP address $(PQRS)_i$ with the actual SrcIP address of the $ML_i$ $(ABCD)_i$ being encapsulated within body of the connection request message 324.

At process 335, the router 140 receives the connection request message 324. The router 140 then acknowledges the tunnel 141 source ID address $(PQRS)_i$, changes the SrcIP address in the message from $(PQRS)_i$ to $(WXYZ)_i$, and then forwards the amended connection request message 324' to the OMS 150 of the destination CCM 180. The SrcIP address $(PQRS)_i$ is encapsulated within the body of the amended request message 324'. The purpose of changing the SrcIP address from $(PQRS)_i$ to $(WXYZ)_i$ is one of security. The CM 186 aboard the aircraft may only recognize a limited number of authorized SrcIP addresses of which $(ABCD)_i$ and $(PQRS)_i$ may not be included.

When the amended communication request 324' is received at the CMC 180, a determination is made as to whether the SrcIP address $(WXYZ)_i$ is a SrcIP address that is recognized by the OMLS 183, at decision point 342. This determination may be accomplished by comparing the SrcIP addresses $(WXYZ)_i$ to a list of pre-authorized SrcIP addresses stored in the CM 186. This list may be referred to as a Logical Diagnostic Index ("LDI") 187. If the SrcIP address $(WXYZ)_i$ is not recognized from the LDI, the amended connection request message 324' is rejected. If the SrcIP addresses $(WXYZ)_i$ is recognized from the LDI, then a communication session 371 is granted by the OMLS 183 at process 356. The communication session 371 will be conducted between the MTF 189 and the $ML_i$ 130. Also at process 356, a router flag or a router bit is set indicating that the message may be automatically passed through the router 140. The router flag is also set for all subsequent messages sent and received during the communication session.

To confirm that the communication session 371 is granted, a unicast completion message 357 is sent back to the requesting $ML_i$ 130. The unicast message may now utilize the IP addresses $(PQRS)_i$ and $(WXYZ)_i$ as destination IP addresses. At process 385, the communication session 371 is conducted through the tunnel 141 in the same manner discussed above, using the same SrcIP addresses $(PQRS)_i$ and $(WXYZ)_i$ to pass back and forth through the router 140.

Concurrently with the communication session 371 being granted, the SrcIP address $(WXYZ)_i$ is registered at the CM 186. The OLMS 183 reads the encapsulated SrcIP address $(PQRS)_i$, associates and records the encapsulated SrcIP address $(PQRS)_i$ address with the corresponding SrcIP address $(WXYZ)_i$ in the CM 186.

In order to control the number of MLs that can conduct a simultaneous communication session 371 with the MTF 189, the CM 186 may have a finite register 188. As each communication session 371 is granted, the registration of the SrcIP address $(WXYZ)_i$ takes one available registration slot in the register 188. When the available slots on the register 188 are completely filled then all further communication requests are summarily rejected until a communication session 371 is broken down and a slot in the register 188 becomes available. One of ordinary skill in the art will recognize the slots in the register 188 may have a relationship to a number of communication ports of the OMLS 183 or the MTF 189 as may be the case depending on the design of the OMS 150.

The CM 186 may comprise a memory 187 in which is stored the LDI 187 and the register 188. Before the OMLS 183 may allow the MTF 189 to commence a communication session 371 between the MTF 189 and the $ML_i$ 130, a recognizable source address $(WXYZ)_i$ must be received by the OMLS 183 that is also on the LDI 187. This precaution ensures that the CMC 180 does not communicate with an unauthorized computing device.

It will be appreciated that the maintenance information on an aircraft would be sensitive information. As such, requiring the validation of the original source ID $(ABCD)_i$ by the router 140, changing the source ID first to $(PQRS)_i$ to gain tunnel access through the router 140 and then changing the SrcIP address to $(WXYZ)_i$ in order to be recognized by the CMC 180, provides three levels of security. The disclosed method thereby complicates access by an unauthorized computing device.

After a session 371 has been commenced, the $MCDF_i$ 160 may periodically transmit a keep-alive message to the OMLS 183 to determine if the communication link through the tunnel 141 is still intact. If after a predefined number of keep-alive retrys has failed to raise a response from the OMLS 183 (e.g. 3 retrys), then it is assumed that the connection with the OMLS 183 has been lost. At that point the flow diagram returns to process 328 where a new connection request message 324 is sent. If the connection has been lost to $ML_i$, the SrcIP address $(WXYZ)_i$ and $(PQRS)_i$ corresponding to $ML_i$ 130 are unregistered from the CM 186, thus freeing up a communications slot for another ML 130.

Further, after a session 371 has been commenced, the $MCDF_i$ 160 may periodically transmit a list of currently accessed aircraft systems 110 to the OMLS 183 that are being accessed directly from the MTF 189 by the $ML_i$ 130 such that the OMS 150 may properly coordinate communications functions, interfaces and data delivery among the OMLS 183, CM 186 and MTF 189.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention, it being understood that various changes may be made in the function and arrangement of elements described in an exemplary embodiment without departing from the scope of the invention as set forth in the appended claims and their legal equivalents.

What is claimed is:

1. A system for securely accessing a source of data of a vehicle by a remote communication device, comprising:
   an intermediary computing device within an IP network and being disposed between the remote communication device and the vehicle, the intermediary computing device comprising:
   a first storage device configured to store a first list of authorized internet protocol (IP) addresses, the authorized IP addresses are according to a first protocol;
   a second storage device configured to store a second list of authorized IP addresses, the authorized IP addresses are according to a second protocol;
   a third storage device configured to store a third list of authorized IP addresses, the authorized IP addresses are according to a third protocol; and
   wherein the intermediary computing device is configured to authorize a connection request from the remote communication device having a first IP address based on the first list; to communicate a second IP address to the remote communication device based on the second list and the connection request; and to communicate a third IP address to the vehicle based on the third list, and
   wherein the intermediary computing device further comprises a number X of registers, where X is an integer greater than 1, and wherein the intermediary computing device is further configured to manage a plurality of connection requests from a plurality of remote communication devices based on the number X of registers.

2. The system of claim 1, wherein the plurality of remote communication devices is limited by the number X.

3. The system of claim 2, wherein the number X is based on a number of communication ports of the vehicle.

4. The system of claim 1, further comprising a second intermediary computing device disposed between the first intermediary computing device and the source of data of the vehicle, the second intermediary computing device comprising: a fourth storage device configured to store a fourth list of authorized IP addresses, the authorized IP addresses are according to the third protocol; and wherein the second intermediary computing device is configured to authorize access to the data source based on the third IP address and the fourth list.

5. The system of claim 1, wherein the remote communication device is a maintenance computing device and the vehicle is an aircraft.

6. The system of claim 1, wherein the first IP address is a static IP address assigned to the remote communication device.

7. The system of claim 1, wherein the first IP address is a dynamic IP address assigned to the remote communication device.

8. The system of claim 1, wherein the intermediary computing device is further configured to receive a destination address, and wherein the authorization is performed based on the destination address.

9. The system of claim 1, wherein the second list of IP address includes tunnel IP addresses.

\* \* \* \* \*